United States Patent
Walker et al.

(10) Patent No.: US 11,379,401 B2
(45) Date of Patent: Jul. 5, 2022

(54) DEFERRED COMMUNICATIONS OVER A SYNCHRONOUS INTERFACE

(71) Applicant: Micron Technology, Inc., Boise, ID (US)

(72) Inventors: Dean E. Walker, Allen, TX (US); Tony Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/074,787

(22) Filed: Oct. 20, 2020

(65) Prior Publication Data
US 2022/0121596 A1    Apr. 21, 2022

(51) Int. Cl.
*G06F 13/40* (2006.01)
*G06F 13/42* (2006.01)
*H04L 12/40* (2006.01)

(52) U.S. Cl.
CPC ...... *G06F 13/4068* (2013.01); *G06F 13/4282* (2013.01); *H04L 12/40032* (2013.01)

(58) Field of Classification Search
CPC ............ G06F 13/4068; G06F 13/4282; H04L 12/40032
See application file for complete search history.

(56) References Cited

U.S. PATENT DOCUMENTS

| | | | | |
|---|---|---|---|---|
| 2003/0101400 A1* | 5/2003 | Anjo | | H04L 1/188 |
| | | | | 714/749 |
| 2005/0281283 A1* | 12/2005 | Beecher | | H04L 5/16 |
| | | | | 370/449 |
| 2006/0159118 A1* | 7/2006 | Shvodian | | H04L 12/403 |
| | | | | 370/449 |
| 2008/0183928 A1* | 7/2008 | Devila | | G06F 13/4291 |
| | | | | 710/110 |
| 2012/0072628 A1 | 3/2012 | Crockett et al. | | |
| 2014/0115209 A1* | 4/2014 | Heinrich | | G06F 13/4291 |
| | | | | 710/110 |
| 2017/0270065 A1* | 9/2017 | Ruan | | G06F 13/36 |
| 2018/0276157 A1* | 9/2018 | Lofamia | | G06F 13/4282 |
| 2018/0293192 A1 | 10/2018 | Hung et al. | | |
| 2019/0303307 A1 | 10/2019 | Zitlaw | | |

FOREIGN PATENT DOCUMENTS

KR    20100087328    8/2010

OTHER PUBLICATIONS

"International Application Serial No. PCT US2021 053964, International Search Report dated Jan. 26, 2022", 3 pgs.
"International Application Serial No. PCT US2021 053964, Written Opinion dated Jan. 26, 2022", 4 pgs.

* cited by examiner

*Primary Examiner* — Henry Tsai
*Assistant Examiner* — Harry Z Wang
(74) *Attorney, Agent, or Firm* — Schwegman Lundberg & Woessner, P.A.

(57) ABSTRACT

A chiplet system can include a Serial Peripheral Interface (SPI) bus for communication. A primary device coupled to the SPI bus can generate read or write instructions for a secondary device. In response to instructions from the primary device, the secondary device can prepare a response. The response message can include a secondary device status field to indicate a readiness of the secondary device to provide a particular data payload to the primary device. Using deferrals that are communicated from the secondary device to the primary device can enable longer latency SPI operations to proceed without monopolizing the SPI bus.

20 Claims, 11 Drawing Sheets

DEFERRED COMMUNICATIONS OVER A SYNCHRONOUS INTERFACE

TECHNICAL FIELD

Embodiments of the disclosure relate generally to chiplet-based electronic systems and to communications in such systems.

BACKGROUND

Chiplets are an emerging technique for integrating various processing functionality. Generally, a chiplet system is made up of discrete chips (e.g., integrated circuits (ICs) on different substrate or die) that are integrated on an interposer and packaged together. This arrangement is distinct from single chips (e.g., ICs) that contain distinct device blocks (e.g., intellectual property (IP) blocks) on one substrate (e.g., single die), such as a system-on-a-chip (SoC), or discretely packaged devices integrated on a board. In general, chiplets provide better performance (e.g., lower power consumption, reduced latency, etc.) than discretely packaged devices, and chiplets provide greater production benefits than single die chips. These production benefits can include higher yields or reduced development costs and time.

Chiplet systems are generally made up of one or more application chiplets and support chiplets. Here, the distinction between application and support chiplets is simply a reference to the likely design scenarios for the chiplet system. Thus, for example, a synthetic vision chiplet system can include an application chiplet to produce the synthetic vision output along with support chiplets, such as a memory controller chiplet, sensor interface chiplet, or communication chiplet. In a typical use case, the synthetic vision designer can design the application chiplet and source the support chiplets from other parties. Thus, the design expenditure (e.g., in terms of time or complexity) is reduced by avoiding the design and production of functionality embodied in the support chiplets. Chiplets also support the tight integration of IP blocks that can otherwise be difficult, such as those using different feature sizes. Thus, for example, devices designed during a previous fabrication generation with larger feature sizes, or those devices in which the feature size is optimized for power, speed, or heat generation—as can happen with sensors—can be more easily integrated with devices having different feature sizes. Additionally, by reducing the overall size of the die, the yield for chiplets tends to be higher than that of more complex, single die devices.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
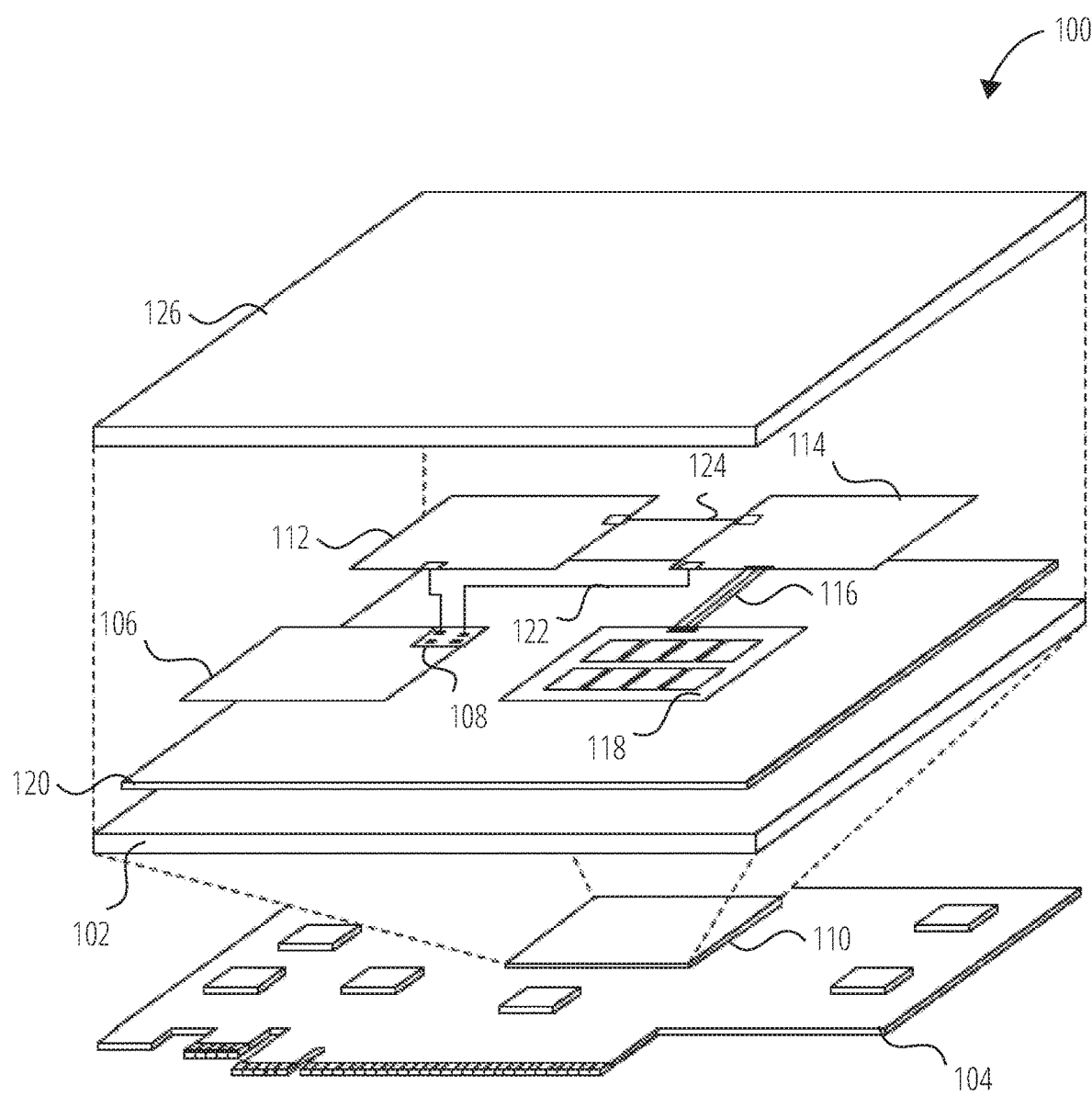
FIG. 1A illustrates a first example of a chiplet system in accordance with one embodiment.

A variety of communications protocols can be used to communicate between a host and a memory device in a system, such as a chiplet system. Examples of such protocols can include the Open NAND Flash Interface (ONFi), eMMC, UFS, or Serial Peripheral Interface (SPI), among others. These protocols generally enable the host, primary device, or controller, to communicate commands—such as write (e.g., program), read, request the status of a command, request the status of the memory device, start or perform housekeeping operations such as intra-memory transfers, garbage collection, etc.—with the memory device. Generally, these protocols restrict initiation of communication to the host. That is, the host makes a request and the memory device responds. In some examples, the memory device can issue an exception (e.g., interrupt) that is designed to prompt the host to make a request for the status of the operation subject to the exception.

To facilitate communication among chiplets in a system, chiplets can include multiple input-output (I/O) channels (e.g., AIB channels), such as can be arranged in columns of channels at a periphery of the chiplets. The I/O channels can be configured in a manner dependent on the particular design or system objective. For example, the I/O channels of chiplets can be configured as receive (RX) channels, transmit (TX) channels, or a mix of RX/TX channels.

In an example, one or more chiplets of a system can include initialization logic circuitry to advance a chiplet I/O interface through various stages or phases of initialization. In some examples, chiplets can include a communication interface (e.g., a serial peripheral interface or SPI) and configuration data can be communicated among the chiplets using the communication interface. In some examples, the communication interface can be implemented using auxiliary channels (AUX) of the I/O channels and the configuration data can be communicated using out-of-band signaling.

In an example, initialization logic circuitry can be configured to advance initialization of a chiplet interface sequentially through the interface layers starting with a lowest interface layer (e.g., the physical layer). The initialization can advance through multiple initialization phases with one interface layer initialized during each phase by writing initialization data to the chiplet I/O channels during each initialization phase.

Not all chiplet designs may have or use the same type of initialization. For example, individual chiplets may support only a hardware-based initialization option for the I/O channels or may support only a software-based initialization option for the I/O channels. Because a chiplet-based system can include different chiplet designs mixed in the same system, and without a standard method to support both hardware-based and software-based approaches, each system would need an individual, ad hoc hardware-based or software-based initialization method. This could result in some I/O channels of the chiplets not being interoperable with other I/O channels of the chiplets.

In an example, a standardized method of initialization of the I/O channels of the chiplets can allow all chiplets of a multi-chiplet system and I/O interface to be interoperable within a single system. The standardized method can be used for both hardware-based and software-based initialization mechanisms to guarantee interoperability of the interconnected chiplet I/O channels. In an example, the initialization methods can include or use communication among chiplets using an SPI bus.

An issue with traditional SPI communications arises from a general dependence on timing or latency of peripherals or secondary devices. As used in this description, a primary device, such as a host, may manage or control communications with or operations of one or more secondary devices. The relationship between primary and secondary devices may be an asymmetric one that has sometimes been referred to in the art using the antiquated terms master and slave. Such relationships may also be referred to as parent/child, supervisor/worker, controller/peripheral, or the like.

Slower secondary devices, or secondary devices configured to carry out computationally complicated or time-consuming activities, can tie up or occupy an SPI bus and thus inhibit communication between other devices on the bus. For example, if an SPI secondary device is unable to respond immediately to a read request from a primary device, then the SPI bus can be occupied unless or until the secondary device completes its operations and prepares and sends its response. This can be problematic and introduce significant delays, for example, during initialization where multiple chiplets in a system need to be initialized to activate a system.

To address the issue, an SPI system can be configured to use deferred data transactions. In an example, a primary device, such as can include or comprise a first chiplet, can issue a request for a specified payload. In response, a secondary device, or a second chiplet, can be configured to generate a response message that can include a secondary device status field. The secondary device status field can include information about whether the secondary device requires or requests additional processing time to prepare a suitable or expected reply, such as with the specified payload. The secondary device can send a message with the secondary device status field to the primary device and, in turn, the primary device can queue a later request, such as for the same specified payload. In this manner, control over occupation of the SPI bus can be provided to the primary device or first chiplet. The primary device can then determine, for example, whether to continue issuing read requests for the specified payload to the secondary device, or whether other operations, such as using other secondary devices coupled to the bus, can be performed.

FIG. 1A, described below, offers an example of a chiplet system and the components operating therein. Within the context of such a chiplet system, an issue can arise in communication among the chiplets or in communication with other systems or devices coupled to the chiplet system. In a chiplet system that includes a serial peripheral interface (SPI), a first secondary device generally can be configured to respond to a read request from a primary device within a specified number of clock cycles. The SPI interface, which is generally coupled to one or multiple other secondary devices, can be inhibited from carrying out other data communication until the first secondary device, or chiplet, sends its complete response. The present inventors have recognized, among other things, that a solution to this issue can include using a secondary device status field in an SPI message. The secondary device status field can indicate when a secondary device is ready to send a response. If the secondary device status field indicates the secondary device is not ready to respond, then the primary device can be configured to issue a later request or deferred request. Additional details and examples are provided below.

Figure 1B:
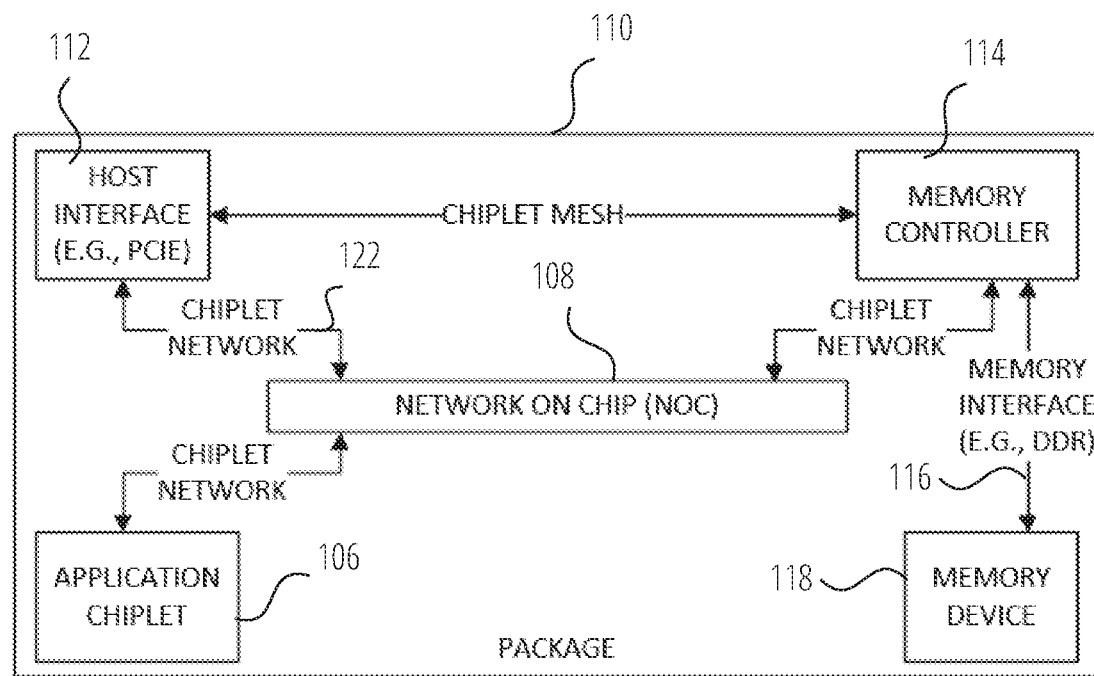
FIG. 1B illustrates a second example of a chiplet system in accordance with one embodiment.

FIG. 1A and FIG. 1B illustrate an example of a first system 100 that can include one or more chiplets, according to an embodiment. FIG. 1A is a representation of the chiplet system 110 mounted on a peripheral board 104, that can be connected to a broader computer system by a peripheral component interconnect express (PCIe), for example. The chiplet system 110 includes a package substrate 102, an interposer 120, and four chiplets, an application chiplet 106, a host interface chiplet 112, a memory controller chiplet 114, and a memory device chiplet 118. Other systems may include additional chiplets to provide additional functionalities, as will be apparent from the following discussion. The package of the chiplet system 110 is illustrated with a cover or lid 126, though other packaging techniques and structures for the chiplet system 110 can be used. FIG. 1B is a block diagram labeling the components in the chiplet system for clarity.

The application chiplet 106 is illustrated as including a network-on-chip (NOC 108) to support an inter-chiplet communications network, or chiplet network 122. In example embodiments, NOC 108 may be included on the application chiplet 106. In some examples, NOC 108 may be defined in response to selected support chiplets (e.g., the host interface chiplet 112, memory controller chiplet 114, or memory device chiplet 118) thus enabling a designer to select an appropriate number or chiplet network connections or switches for the NOC 108. In an example, the NOC 108 can be located on a separate chiplet, or even within the interposer 120. In examples as discussed herein, the NOC 108 implements an inter-chiplet communications network as a chiplet protocol interface (CPI) network.

The CPI is a packet-based network that supports virtual channels to enable a flexible and high-speed interaction between chiplets. CPI enables bridging from intra-chiplet networks to the chiplet network 122. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI successfully bridges intra-chiplet networks across the chiplet network 122.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB controller or peripheral depending on which chiplet provides the controller clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half RX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency may be utilized. CPI includes elements to minimize both latency and energy consumption in these ultra-short reach chiplet interconnects.

For flow control, CPI employs a credit-based technique. A recipient, such as the application chiplet 106, provides a sender, such as the memory controller chiplet 114, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender to allow transmitting of additional information.

Also illustrated is a chiplet mesh network 124 that uses a direct, chiplet-to-chiplet technique without the need for the NOC 108. The chiplet mesh network 124 can be implemented in CPI, or another chiplet-to-chiplet protocol. The chiplet mesh network 124 generally enables a pipeline of chiplets where one chiplet serves as the interface to the pipeline while other chiplets in the pipeline interface only with themselves.

Additionally, dedicated device interfaces, such as an SPI interface or one or more standard memory interfaces, such as the memory interface 116 (such as, for example, synchronous memory interfaces, such as DDR5, DDR6), can also be used to interconnect chiplets. Connection of a chiplet system or individual chiplets to external devices such as a larger system can be through a desired interface, for example, a PCIe interface. Such an external interface may be implemented, in some examples, through a host interface chiplet 112, which in the depicted examples, provides a PCIe interface external to the chiplet system 110. Such dedicated interfaces are generally employed when a convention or standard in the industry has converged on such an interface. The illustrated example of a Double Data Rate (DDR) interface 116 connecting the memory controller chiplet 114 to a dynamic random access memory (DRAM) memory device is an example of such an industry convention.

Of the variety of possible support chiplets, the memory controller chiplet 114 is likely present in the chiplet system 110 due to the near omnipresent use of storage for computer processing as well as sophisticated state-of-the-art memory devices. Thus, using a memory device chiplet 118 and memory controller chiplet 114 produced by others gives chiplet system designers access to robust products by sophisticated producers. Generally, the memory controller chiplet 114 provides a memory device specific interface to read, write, or erase data. Often, the memory controller chiplet 114 can provide additional features, such as error detection, error correction, maintenance operations, or atomic operation execution. For some types of memory, maintenance operations tend to be specific to the memory device chiplet 118, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In some flash memory configurations, for example, "managed NAND" devices, some or all of such management operations can be under control of a dedicated NAND memory controller coupled to multiple NAND memory die. In other types of memory, for example DRAM, some memory operations, such as refresh, may be controlled by a host processor or by a memory controller at some times, and at other times controlled by the DRAM memory device itself, or by logic associated with one or more DRAM devices, such as an interface chip (in some examples, a buffer). Such an interface/buffer may be utilized in some examples to redistribute and change the clock rate of signals between an interface and individual memory devices. In some examples, such an interface/buffer may incorporate additional control functionality.

Atomic operations are a data manipulation that, for example, may be performed by the memory controller chiplet 114. In other chiplet systems, the atomic operations may be performed by other chiplets. For example, an atomic operation of "increment" can be specified in a command by the application chiplet 106, the command including a memory address and possibly an increment value. Upon receiving the command, the memory controller chiplet 114 retrieves a number from the specified memory address, increments the number by the amount specified in the command, and stores the result. Upon a successful completion, the memory controller chiplet 114 provides an indication of a command success to the application chiplet 106. Atomic operations avoid transmitting the data across the chiplet network 122, resulting in lower latency execution of such commands.

Atomic operations can be classified as built-in atomics or programmable (e.g., custom) atomics. Built-in atomics are a finite set of operations that are immutably implemented in hardware. Programmable atomics are small programs that can run on a programmable atomic unit (PAU) (e.g., a custom atomic unit (CAU)) of the memory controller chiplet 114. FIG. 1A illustrates an example of a memory controller chiplet that discusses a PAU.

The memory device chiplet 118 can be, or include any combination of, volatile memory devices or non-volatile memories. Examples of volatile memory devices include, but are not limited to, random access memory (RAM)—such as DRAM, synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device chiplet 118 as a chiplet, however, the memory device chiplet 118 can reside elsewhere, such as in a different package on the peripheral board 104. For many applications, multiple memory device chiplets may be provided. In some examples, these memory device chiplets may each implement one or multiple storage technologies. In some examples, a memory chiplet may include, multiple stacked memory die of different technologies, for example one or more SRAM devices stacked or otherwise in communication with one or more DRAM devices. Memory controller chiplet 114 may also serve to coordinate operations between multiple memory chiplets in the chiplet system 110; for example, to utilize one or more memory chiplets in one or more levels of cache storage, and to use one or more additional memory chiplets as main memory. Chiplet system 110 may also include multiple memory controllers, as may be used to provide memory control functionality for separate processors, sensors, networks, etc. A chiplet architecture, such as in the chiplet system 110 offers particular advantages in allowing adaptation to different memory storage technologies, and different memory interfaces, through updated chiplet configurations, without requiring redesign of the remainder of the system structure.

Figure 2:
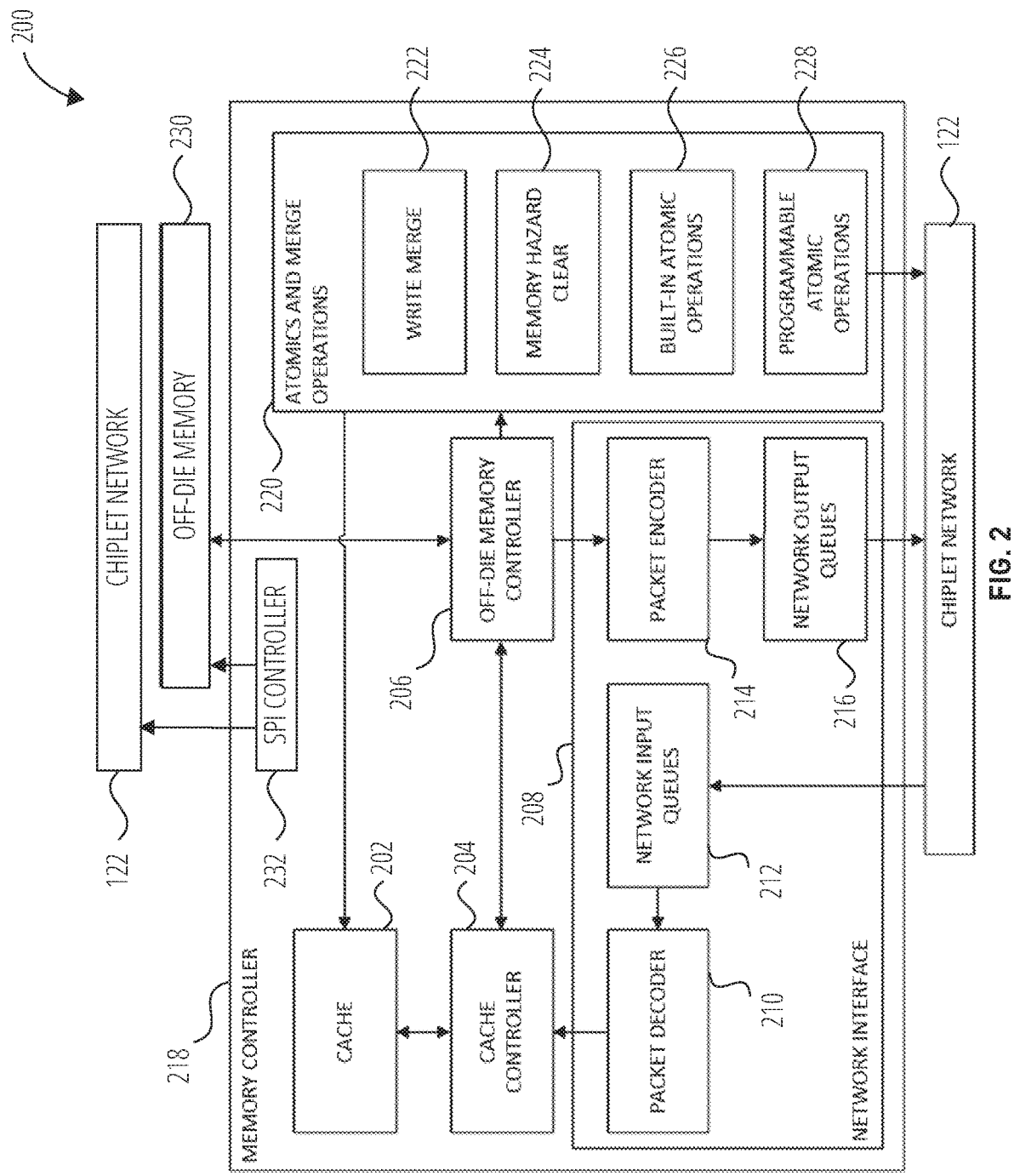
FIG. 2 illustrates an example of a memory controller chiplet in accordance with one embodiment.

FIG. 2 illustrates components of an example of a memory controller chiplet 218, such as the memory controller chiplet 114 of FIG. 1A. according to an embodiment. The memory controller chiplet 218 includes a cache 202, a cache controller 204, an off-die memory controller 206 (e.g., to communicate with an off-die memory 230), a network communication interface 208 (e.g., to interface with the chiplet network 122) and communicate with other chiplets), an SPI controller 232, and a set of atomic and merge operations 220. Members of this set can include, for example, a write merge unit 222, a hazard unit (memory hazard clear unit 224), built-in atomic unit 226, or a PAU 228. The various components are illustrated logically, and not as they necessarily would be implemented. For example, the built-in atomic unit 226 likely comprises different devices along a path to the off-die memory. For example, the built-in atomic unit 226 could be located in an interface device/buffer on a memory chiplet, as discussed above. In contrast, the programmable atomic operations are likely implemented in a separate processor on the memory controller chiplet 218 (but in various examples may be implemented in other locations, for example on a memory chiplet).

The off-die memory controller 206 is directly coupled to the off-die memory 230 (e.g., via a bus or other communication connection) to provide write operations and read operations to and from the off-die memory 230. In the depicted example, the off-die memory controller 206 is also coupled for output to the atomic and merge operations 220, and for input to the cache controller 204 (e.g., a memory side cache controller). In an example, the off-die memory controller 206 can be coupled to the off-die memory 230 using an SPI bus.

In an example, the off-die memory controller 206 (e.g., a memory controller for off-die memory) can include or comprise a portion of the SPI controller 232. The SPI controller 232 can be coupled to an SPI bus and configured to manage communication between the memory controller chiplet 114 and one or more other chiplets, such as other chiplets in the chiplet network 122 or the off-die memory 230. In an example, the memory controller chiplet 114 can use the SPI controller 232 to carry out initialization routines with various chiplets coupled to the memory controller chiplet 114. Once initialized, the memory controller chiplet 114 can continue to use SPI-based communications with the chiplets or can change to using other protocols or busses.

In an example, the SPI controller 232 or bus controller can be provided on the host interface chiplet 112, and the host interface chiplet 112 can use a PCIe interface to communicate outside of the chiplet system 110. A memory controller, such as the memory controller chiplet 114, can be an SPI memory device or SPI secondary device. The memory controller can, in turn, be configured to use another memory interface such as the memory interface 116.

In the example configuration, the cache controller 204 is directly coupled to the cache 202, and may be coupled to the network communication interface 208 for input (such as incoming read or write requests), and coupled for output to the off-die memory controller 206.

The network communication interface 208 includes a packet decoder 210, network input queues 212, a packet encoder 214, and network output queues 216 to support a packet-based chiplet network 122, such as CPI. The chiplet network 122 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 122 can be implemented as a collection of crossbar switches having a folded clos configuration, or a mesh network providing for additional connections, depending upon the configuration.

In various examples, the chiplet network 122 can be part of an asynchronous switching fabric. Here, a data packet can be routed along any of various paths, such that the arrival of any selected data packet at an addressed destination can occur at any of multiple different times, depending upon the routing. Additionally, the chiplet network 122 can be implemented at least in part as a synchronous communication network, such as a synchronous mesh communication network. Both configurations of communication networks are contemplated for use in accordance with the present disclosure.

The memory controller chiplet 218 can receive a packet having, for example, a source address, a read request, and a physical address. In response, the off-die memory controller 206 or the cache controller 204 will read the data from the specified physical address (which can be in the off-die memory 230 or in the cache 202), and assemble a response packet to the source address containing the requested data. Similarly, the memory controller chiplet 218 can receive a packet having a source address, a write request, and a physical address. In response, the memory controller chiplet 218 will write the data to the specified physical address (which can be in the off-die memory 230 or in the cache 202), and assemble a response packet to the source address containing an acknowledgement that the data was stored to a memory.

Thus, the memory controller chiplet 218 can receive read and write requests via the chiplet network 122 and process the requests using the cache controller 204 interfacing with the cache 202, if possible. If the request cannot be handled by the cache controller 204, then the off-die memory controller 206 handles the request by communication with the off-die memory 230, the atomic and merge operations 220, or both. As noted above, one or more levels of cache may also be implemented in off-die memory 230 and in some such examples may be accessed directly by the cache controller 204. Data read by the off-die memory controller 206 can be cached in the cache 202 by the cache controller 204 for later use.

The atomic and merge operations 250 are coupled to receive (as input) the output of the off-die memory controller 220, and to provide output to the cache 210, the network communication interface 225, or directly to the chiplet network 280. The reset or memory hazard clear unit 224, write merge unit 222, and the built-in (e.g., predetermined) built-in atomic unit 226 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 228 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor.

The write merge unit 222 receives read data and request data, and merges the request data and read data to create a single unit having the read data and the source address to be used in the response or return data packet). The write merge unit 222 provides the merged data to the write port of the cache 202 (or, equivalently, to the cache controller 204 to write to the cache 202). Optionally, the write merge unit 222 provides the merged data to the network communication interface 208 to encode and prepare a response or return data packet for transmission on the chiplet network 122.

When the request data is for a built-in atomic operation, the built-in atomic unit 226 receives the request and reads data, either from the write merge unit 222 or directly from the off-die memory controller 206. The atomic operation is performed, and using the write merge unit 222, the resulting data is written to the cache 202, or provided to the network communication interface 208 to encode and prepare a response or return data packet for transmission on the chiplet network 122.

The built-in atomic unit 226 handles predefined atomic operations such as fetch-and-increment or compare-and-swap. In an example, these operations perform a simple read-modify-write operation to a single memory location of 32-bytes or less in size. Atomic memory operations are initiated from a request packet transmitted over the chiplet network 122. The request packet has a physical address, atomic operator type, operand size, and optionally up to 32-bytes of data. The atomic operation performs the read-modify-write to a cache memory line of the cache 202, filling the cache memory if necessary. The atomic operator response can be a simple completion response, or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operations can also involve requests for a "standard" atomic operation on the requested data, such as a comparatively simple, single cycle, integer atomics-such as fetch-and-increment or compare-and-swap-which will occur with the same throughput as a regular memory read or write operation not involving an atomic operation. For these operations, the cache controller 204 may generally reserve a cache line in the cache 202 by setting a hazard bit (in hardware), so that the cache line cannot be read by another process while it is in transition. The data is obtained from either the off-die memory 230 or the cache 202, and is provided to the built-in atomic unit 226 to perform the requested atomic operation. Following the atomic operation, in addition to providing the resulting data to the packet encoder 214 to encode outgoing data packets for transmission on the chiplet network 122, the built-in atomic unit 226 provides the resulting data to the write merge unit 222, which will also write the resulting data to the cache 202. Following the writing of the resulting data to the cache 202, any corresponding hazard bit which was set will be cleared by the memory hazard clear unit 224.

The PAU 228 enables high performance (high throughput and low latency) for programmable atomic operations (also referred to as "custom atomic operations"), comparable to the performance of built-in atomic operations. Rather than executing multiple memory accesses, in response to an atomic operation request designating a programmable atomic operation and a memory address, circuitry in the memory controller chiplet 218 transfers the atomic operation request to PAU 228 and sets a hazard bit stored in a memory hazard register corresponding to the memory address of the memory line used in the atomic operation, to ensure that no other operation (read, write, or atomic) is performed on that memory line, which hazard bit is then cleared upon completion of the atomic operation. Additional, direct data paths provided for the PAU 228 executing the programmable atomic operations allow for additional write operations without any limitations imposed by the bandwidth of the communication networks and without increasing any congestion of the communication networks.

The PAU 228 includes a multi-threaded processor, for example, such as a RISC-V ISA based multi-threaded processor having one or more processor cores, and further having an extended instruction set for executing programmable atomic operations. When provided with the extended instruction set for executing programmable atomic operations, the PAU 228 can be embodied as one or more hybrid threading processors. In some example embodiments, the PAU 228 provides barrel-style, round-robin instantaneous thread switching to maintain a high instruction-per-clock rate.

Programmable atomic operations can be performed by the PAU 228 involving requests for a programmable atomic operation on the requested data. A user can prepare programming code to provide such programmable atomic operations. For example, the programmable atomic operations can be comparatively simple, multi-cycle operations such as floating-point addition, or comparatively complex, multi-instruction operations such as a Bloom filter insert. The programmable atomic operations can be the same as or different than the predetermined atomic operations, insofar as they are defined by the user rather than a system vendor. For these operations, the cache controller 204 can reserve a cache line in the cache 202, by setting a hazard bit (in hardware), so that cache line cannot be read by another process while it is in transition. The data is obtained from either the off-die memory 230 or the cache 202, and is provided to the PAU 228 to perform the requested programmable atomic operation. Following the atomic operation, the PAU 228 will provide the resulting data to the network communication interface 208 to directly encode outgoing data packets having the resulting data for transmission on the chiplet network 122. In addition, the PAU 228 will provide the resulting data to the cache controller 204, which will also write the resulting data to the cache 202. Following the writing of the resulting data to the cache 202, any corresponding hazard bit which was set will be cleared by the cache controller 204.

In selected examples, the approach taken for programmable atomic operations is to provide multiple, generic, custom atomic request types that can be sent through the chiplet network 122 to the memory controller chiplet 218 from an originating source such as a processor or other system component. The cache controller 204 and/or off-die memory controller 206 identify the request as a custom atomic and forward the request to the PAU 228. In a representative embodiment, the PAU 228: (1) is a programmable processing element capable of efficiently performing a user defined atomic operation; (2) can perform load and stores to memory, arithmetic and logical operations and control flow decisions; and (3) leverages the RISC-V ISA with a set of new, specialized instructions to facilitate interacting with the controllers to atomically perform the user-defined operation. In desirable examples, the RISC-V ISA contains a full set of instructions that support high level language operators and data types. The PAU 228 can leverage the RISC-V ISA, but will commonly support a more limited set of instructions and limited register file size to reduce the die size of the unit when included within the memory controller chiplet 218.

As mentioned above, prior to the writing of the read data to the cache 202, the set hazard bit for the reserved cache line is to be cleared, by the memory hazard clear unit 224. Accordingly, when the request and read data is received by the write merge unit 222, a reset or clear signal can be transmitted by the memory hazard clear unit 224 to the cache 202 to reset the set memory hazard bit for the reserved cache line. Also, resetting this hazard bit will also release a pending read or write request involving the designated (or reserved) cache line, providing the pending read or write request to an inbound request multiplexer for selection and processing.

In an example, a chiplet system can be configured to include or use a serial peripheral interface (SPI). An SPI bus generally includes a multiple-wire serial communication interface that enables a synchronous data link between two devices, a primary device and a secondary device. It provides support for a low to medium bandwidth network connection between the devices supporting the SPI. In a chiplet system with an SPI bus, the primary device can be a first chiplet, and the secondary device, or secondary devices, can be one or more other chiplets coupled to the first chiplet using the SPI bus.

The wires of the SPI bus include two control lines and two data lines. The control lines of the SPI bus include a chip select (CS) line, and a serial clock line (SCLK). In some examples, more than one secondary device can be connected to the primary device, however, only one secondary device can generally be accessed at any given time. Selection of a particular secondary device from among multiple secondary devices can be accomplished using the chip select or CS line. A CS signal is outputted from the primary device and allows for activation and deactivation of a secondary device by the primary device. Every secondary device can use its own separate CS line for activation.

The primary device can also provide a serial clock signal. The clock signal can be used to clock the shifting of serial data into and out of the primary and secondary devices. Use of this clock allows SPI architecture to operate in a primary/secondary full duplex mode, wherein data can be transferred simultaneously from one device to another.

The data lines of the SPI bus can include a Serial Data In (SDI) line and a Serial Data Out (SDO) line. The SDI line is a data communication line that outputs data from the primary device to the secondary device. The SDO line is a second data communication line used to output data from the secondary device to the primary device. Both data lines are active only when the chip select line is activated for the specified secondary device.

In an example, initialization of I/O channels of multiple chiplets in the chiplet system 110 can include or use an SPI bus. Using the SPI bus, I/O channels for all chiplets of a multi-chiplet I/O interface can be interoperable within a single system. The SPI-based techniques discussed herein can be used for both hardware-based and software-based initialization mechanisms to guarantee interoperability of the interconnected chiplet I/O channels.

Figure 3:
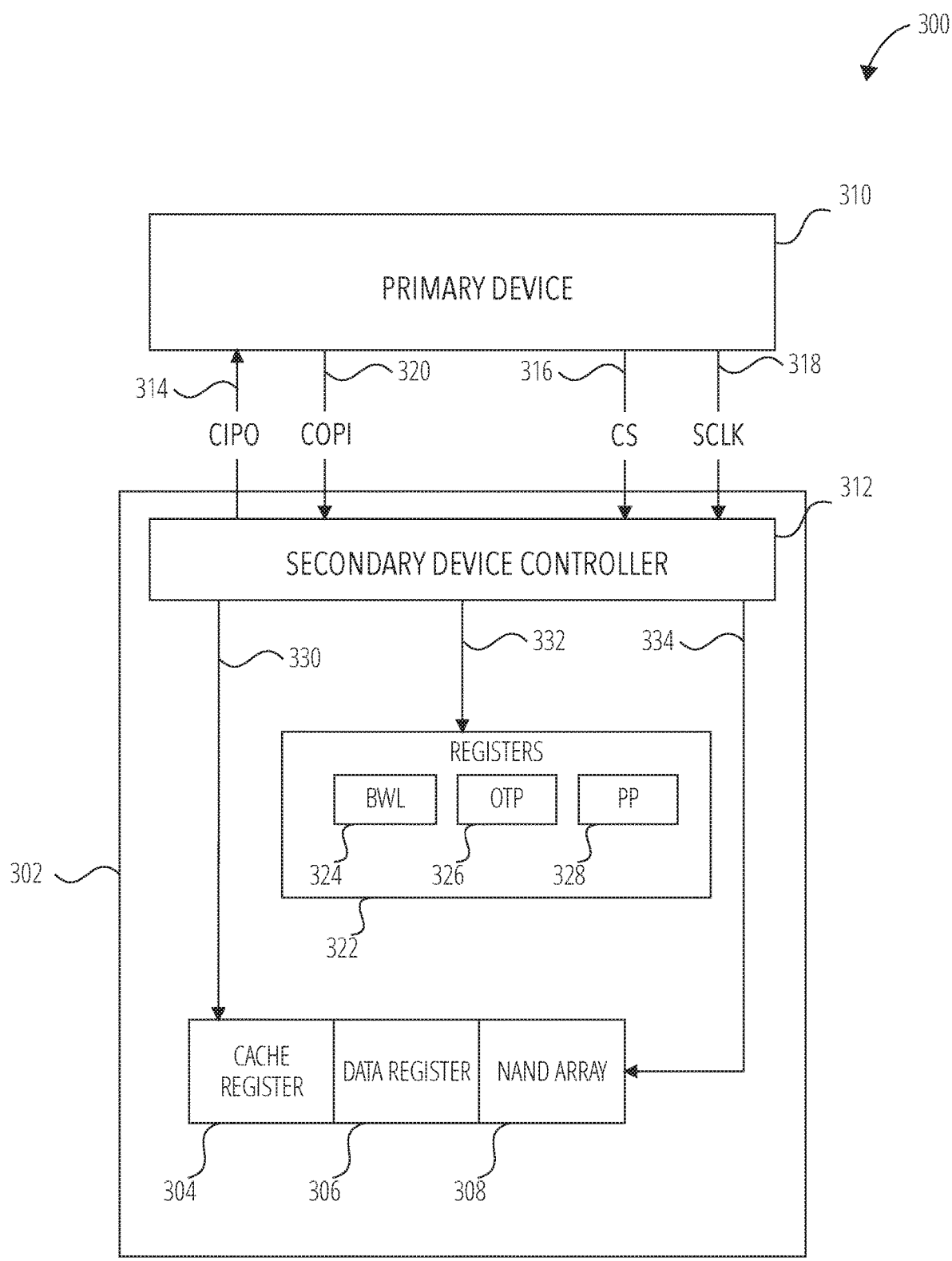
FIG. 3 illustrates an SPI system in accordance with one embodiment.

FIG. 3 illustrates generally an example of an SPI system 300. The SPI system 300 can include a primary device 310 or first chiplet interfaced with a secondary device or second chiplet, such as an SPI memory device 302. In an example, the SPI system 300 can comprise a portion of the first system 100 from the example of FIG. 1A, or the first example 200 from the example of FIG. 2. For example, one or more of the primary device 310 and the SPI memory device 302 can be a respective chiplet in the first system 100. In an example, the first system 100 includes the primary device 310, the SPI memory device 302 resides outside of the first system 100, and the primary device 310 communicates with the SPI memory device 302 using an SPI interface. In an example, the primary device 310 comprises the memory controller chiplet 114 and the SPI controller 232, and the off-die memory 230 comprises the SPI memory device 302.

A peripheral device or secondary device, such as the SPI memory device 302, can include a secondary device controller 312 with multiple interface pins, including a chip select (CS) pin to receive a select signal 316, a clock (SCLK) pin to receive a clock signal 318, a controller output peripheral input (COPI or MOSI) pin to receive a secondary device input signal 320, and a controller input peripheral output (CIPO or MISO) pin to provide a secondary device output signal 314. Data transfer between the primary device 310 and the SPI memory device 302 or secondary device can take place serially and synchronously using the secondary device output signal 314 and the secondary device input signal 320.

In an example, the primary device 310 can enable the secondary device controller 312 by setting the chip select signal 316 low. After enabling the secondary device controller 312, the primary device 310 can send the clock signal 318 and a corresponding data signal, or secondary device input signal 320. Each bit transmitted in the secondary device input signal 320 or secondary device output signal 314 can be synchronous to either a rising edge or falling edge of the clock signal 318. In an example, the primary device 310 can provide data on the secondary device input signal 320 latched on a rising clock edge and the SPI memory device 302 can provide data on the secondary device output signal 314 on a falling edge. In this example, a first rising edge of the clock signal 318 can correspond to the first bit of the secondary device input signal 320, and subsequent rising clock edges of the clock signal 318 can correspond to subsequent bits of the secondary device input signal 320. Similarly, each bit output on the secondary device output signal 314 can transition on a falling edge of the clock signal 318. Other signal timing schemes can similarly be used.

In an example, communication between the primary device 310 and the secondary device controller 312 can begin when the primary device 310 sets the select signal 316 low. The primary device 310 can subsequently send the clock signal 318 and begin transmitting a message using the secondary device input signal 320. In an example, a message can include a one-byte command followed by a memory address of one or more whole bytes, and further followed by data of one or more whole bytes. The secondary device controller 312 can respond by sending a synchronous message using the secondary device output signal 314. Due to the nature of conventional SPI, the secondary device controller 312 can be configured to output information on the secondary device output signal 314 until a specified or expected time at which the primary device 310 expects or is configured to receive a response.

In an example, the primary device 310 can send a write register command or a read register command in a message to the secondary device controller 312. The write register command or read register command can configure the secondary device controller 312 to access memory registers 322. Data transfer to and from the secondary device controller 312 and registers 322 can use a register bus 332, such as can have a dedicated control wire. The registers 322 can include, for example, a status register to indicate device operation status and/or a special mode enable register such as a block writing lock register or BWL register 324 such as to prevent certain portions of memory from being written. In an example, the registers 322 can include a one time programmable (OTP) enable register, or OTP register 326, such as to enable reading from or writing to an OTP portion of memory, and/or a parameter page (PP) enable register, or PP register 328, such as to enable reading from or writing to a parameter page of memory. In an example, the secondary device controller 312 can be configured to access the registers 322 when it performs other internal operations.

In an example, access to the registers 322 can permit a user or client to control functional aspects of the SPI memory device 302, such as an output buffer drive strength, a desired number of clock cycles of latency for outputting data, an address cycle format to require whole bytes or to use a minimum number of addresses, and/or whether to enable or disable error correcting codes (ECC). Certain registers can hold, for example, error status information, such as can be reset upon the issuance of a register write command, while other registers can enable a user to control timing based on varying clock signal 318 frequencies. In an example, a register can be configured to enable the SPI memory device 302 to switch between different modes and interfaces, such as between SPI NAND and NAND user modes and interfaces.

In an example, to perform an operation at a specified memory address, the secondary device controller 312 can send a memory address signal using a bus to row and column decoders (not depicted). The secondary device controller 312 can control activation of the row and column decoders using a control wire. Depending on the operation, the secondary device controller 312 can, for example, load data bytes into a cache register 304 using a cache bus 330. In an example, a NAND array 308 can receive data, such as one page at a time, through a data register 306, such as in coordination with the cache register 304.

In an example, a first SPI secondary device, such as the SPI memory device 302 or other secondary device or chiplet, can be configured to respond to a read request from a controller or other chiplet, such as the primary device 310, within a specified number of clock cycles. The SPI bus, such as can be coupled to one or multiple secondary devices or chiplets, can be impeded from carrying out other data communication until the first SPI peripheral or secondary device sends a complete response to the primary device 310.

The present inventors have recognized, among other things, that a solution to this bus occupation issue can include using a secondary device status field in an SPI message that is sent from the first SPI secondary device. For example, the secondary device status field can be included in the secondary device output signal 314 that is communicated to the primary device 310. The secondary device status field can indicate that the sending secondary device is or is not ready to send a response. When the secondary device status field indicates the secondary device is not ready to send a response, then the primary device 310 can be configured to issue a later or deferred request to the secondary device. Systems and methods discussed herein can thus be used to enable long latency SPI operations to proceed in the background while an SPI bus is used for other communications or transactions, such as between the primary device 310 and one or more other secondary devices. In an example, systems and methods discussed herein can be used during initialization routines for chiplet systems, for example, using SPI operations and hardware for initial communications before transitioning to other protocols or busses.

In an example, when the first SPI secondary device responds with a deferred read response status, the primary device 310 can queue a later read request for the deferred information. Between receiving the deferred read response status information from the secondary device and issuing the later deferred read request, the primary device 310 can perform other operations using the same SPI bus. In an example, the primary device 310 can eventually issue a deferred read request, such as using a special request signal. In an example, the primary device 310 can immediately issue the deferred read request upon receipt of the deferred read response from a secondary device, or the primary device 310 can issue the deferred read request after a specified or variable blanking period.

In an example, in response to the primary device 310 issuing a deferred read request using the special request signal, the secondary device can optionally issue another deferral if the payload is not yet available. If the payload is available, then the secondary device can reply with a successful secondary device status message and the payload.

The examples of FIG. 4, FIG. 5, FIG. 6, FIG. 7, and FIG. 8 illustrate generally example communication methods or timing diagrams for carrying out deferred-response communications using an SPI. The timing diagrams describe communications using multiple different signal lines or buses on the SPI. Table 1 describes the conventions used in the timing diagrams for the illustrated message fields and associated message contents or usage.

TABLE 1

Example Message Fields in SPI Deferred-Response Communications

| Message Field | Usage |
|---|---|
| C[1:0] | 2-bit Command |
| ID[6:0] | 7-bit Chiplet Identification |
| IDP | Command and Chiplet Identification; e.g., Odd Parity |
| A[31:0] | 32-bit Address |
| AP | Address; e.g., Odd Parity |
| D[63:0] | 64-bit Read or Write Data |
| DP | Data; e.g., Odd Parity |
| S[2:0] | Secondary Device status |
| SP | Secondary Device status; e.g., Odd Parity |

In an example, a 2-bit Command message (e.g., C[1:0] in Table 1) can be provided from the primary device to a secondary device. The Command message can comprise a portion or field of the secondary device input signal 320 and can indicate a command or instruction from the primary device 310. In an example, the Command message can include information about whether the receiving device or secondary device is directed to perform a read operation or a write operation. In an example, the Command message can indicate whether a controller request (e.g., a read request from a primary device) is an initial request or a deferred request.

In an example, a 7-bit Chiplet Identification message and parity bit (e.g., ID[6:0] and IDP in Table 1) can be provided from the primary device to a secondary device. The Chiplet Identification message can be used, for example, to address a particular chiplet in a system, such as in the chiplet system 110. The Chiplet Identification message can be optional and, in an example, is used in cases where individual SPI chip selects are unavailable or unused.

In an example, a 32-bit Address and parity bit (e.g., A[31:0] and AP in Table 1) can follow the Chiplet Identification message. The Address message can be used, for example, to locate a particular register, such as in the data register 306 or elsewhere in the chiplet system 110. In an example, a 64-bit Data message and parity bit (e.g., D[63:0] and DP in Table 1) can follow the Address message. The Data message can comprise a data payload such as for storage in, or retrieval from, the secondary device.

In an example, a Secondary Device status message and parity bit (e.g., S[2:0] and SP in Table 1) can be provided from the secondary device to the primary device. The Secondary Device status message can, in an example, be a one, two, three, or more bit message or field. In the examples illustrated herein, the Secondary Device status message comprises a 3-bit message and a parity bit, however Secondary Device status messages can be configured to have more or fewer bits depending on an amount of information to be exchanged with the message. Table 2 describes generally various commands or information that can be encoded in a Secondary device status message.

TABLE 2

Secondary device status Message Commands

| S[2:0] | Command |
|---|---|
| 0 | Success; e.g., a CSR operation completed successfully |
| 1 | Deferred Read Response; e.g., a CSR Read operation was not completed |
| 2 | Odd Parity Error; e.g., a CSR operation was aborted |
| 3 | Protocol Error; e.g., a CSR operation was aborted |
| 4-6 | Reserved |
| 7 | No Secondary Device Endpoint Present |

The various message fields, usages, and message components discussed herein are examples only and should not be considered limiting. For example, other additional message fields can be used, or fewer message fields can be used in SPI deferred-response communications. In an example, the various fields can be arranged in different orders or sequences to similarly provide deferred-response communications. The various sizes of the message components are provided as examples only.

Figure 4:
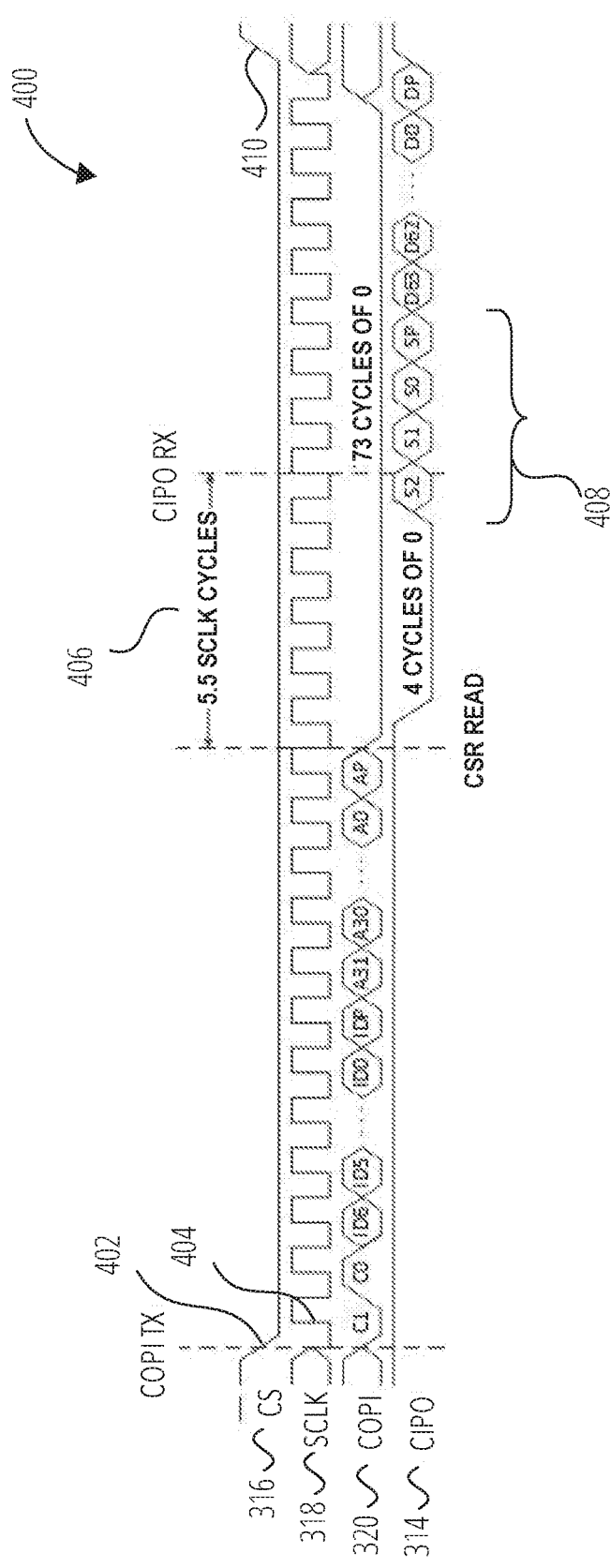
FIG. 4 illustrates a first timing diagram in accordance with one embodiment.
Figure 5:
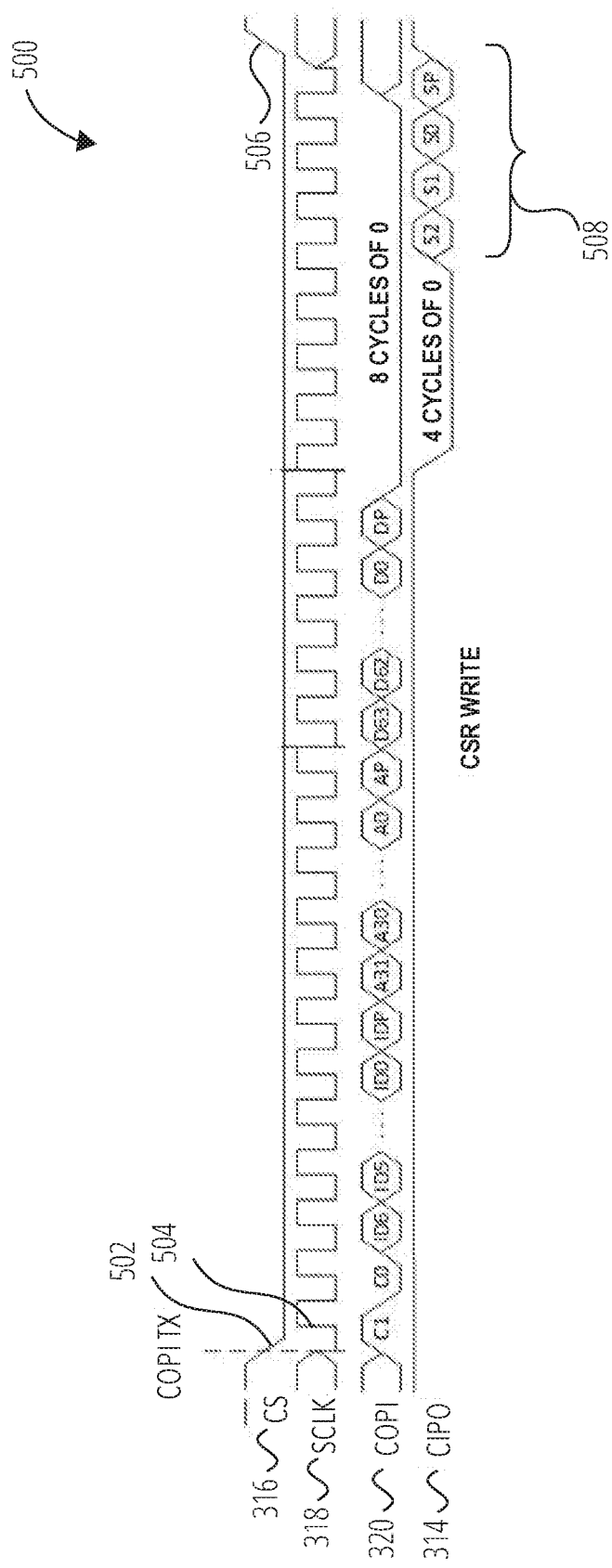
FIG. 5 illustrates a second timing diagram in accordance with one embodiment.

Using the conventions provided in Table 1 and Table 2, FIG. 4 illustrates generally a first timing diagram 400 that includes using a secondary device status field in messages used in a read operation, and FIG. 5 illustrates generally a second timing diagram 500 that includes using a secondary device status field in messages used in a write operation.

The example of FIG. 4 shows a general timing diagram for various signals communicated using an SPI bus, such as between the primary device 310 and the SPI memory device 302. FIG. 4 includes examples of the select signal 316, the clock signal 318, the secondary device input signal 320, and the secondary device output signal 314. As mentioned above, the primary device 310 can initiate communication by setting the select signal 316 low, as generally indicated by reference numeral 402.

In the example of FIG. 4, a first rising edge 404 of the clock signal 318 corresponds to a first bit of the 2-bit Command message. In FIG. 4, the 2-bit Command message is 0-1 and indicates to the secondary device that the message includes a first or initial read instruction. Following the Command message, the primary device 310 can send the Chiplet Identification message, such as followed by the Address message, such as to indicate a register location. The bits of the various message bit components can correspond to respective pulses in the clock signal 318. In the example of FIG. 4, a blanking period can follow the Address message.

In response to the Command, Chiplet Identification, and Address messages, the secondary device can prepare and communicate a response to the primary device 310, such as using the secondary device output signal 314. In the example of FIG. 4, the secondary device output signal 314 comprises a signal that leads with a secondary device status message 408. Depending on the information in the secondary device status message 408, the secondary device output signal 314 can include or comprise a payload, such as comprising an n-bit Data message. The communication can terminate when the primary device 310 sets the select signal 316 high, such as indicated in FIG. 4 by reference numeral 410.

The example of FIG. 5 shows a second timing diagram 500 for various signals communicated using an SPI bus, such as between the primary device 310 and the SPI memory device 302. FIG. 5 includes examples of the select signal 316, the clock signal 318, the secondary device input signal 320, and the secondary device output signal 314. As mentioned above, the primary device 310 can initiate communication by setting the select signal 316 signal low, as generally indicated by reference numeral 502.

In the example of FIG. 5, a first rising edge 504 of the clock signal 318 corresponds to a first bit of the 2-bit Command message. In FIG. 5, the 2-bit Command message is 1-0 and indicates to the secondary device that the message includes a write instruction. Following the Command message, the primary device 310 can send the Chiplet Identification message, such as followed by the Address message, such as to indicate a register location. Following the Address message, the primary device 310 can send the Data message or payload, such as for storage in a register indicated by the information in the Address message portion of the communication. In the example of FIG. 5, a blanking period can follow the Data message.

Following the blanking period and in response to the write instruction, the secondary device can return a message to the primary device 310 using the secondary device output signal 314. In the example of FIG. 5, the returned message can include a secondary device status message 508. Using the information in the secondary device status message 508, the primary device 310 can be configured to take a particular responsive action. For example, the secondary device status message 508 can indicate to the primary device 310 that it should queue a deferred read request, such as to the same or different secondary device.

Figure 6:
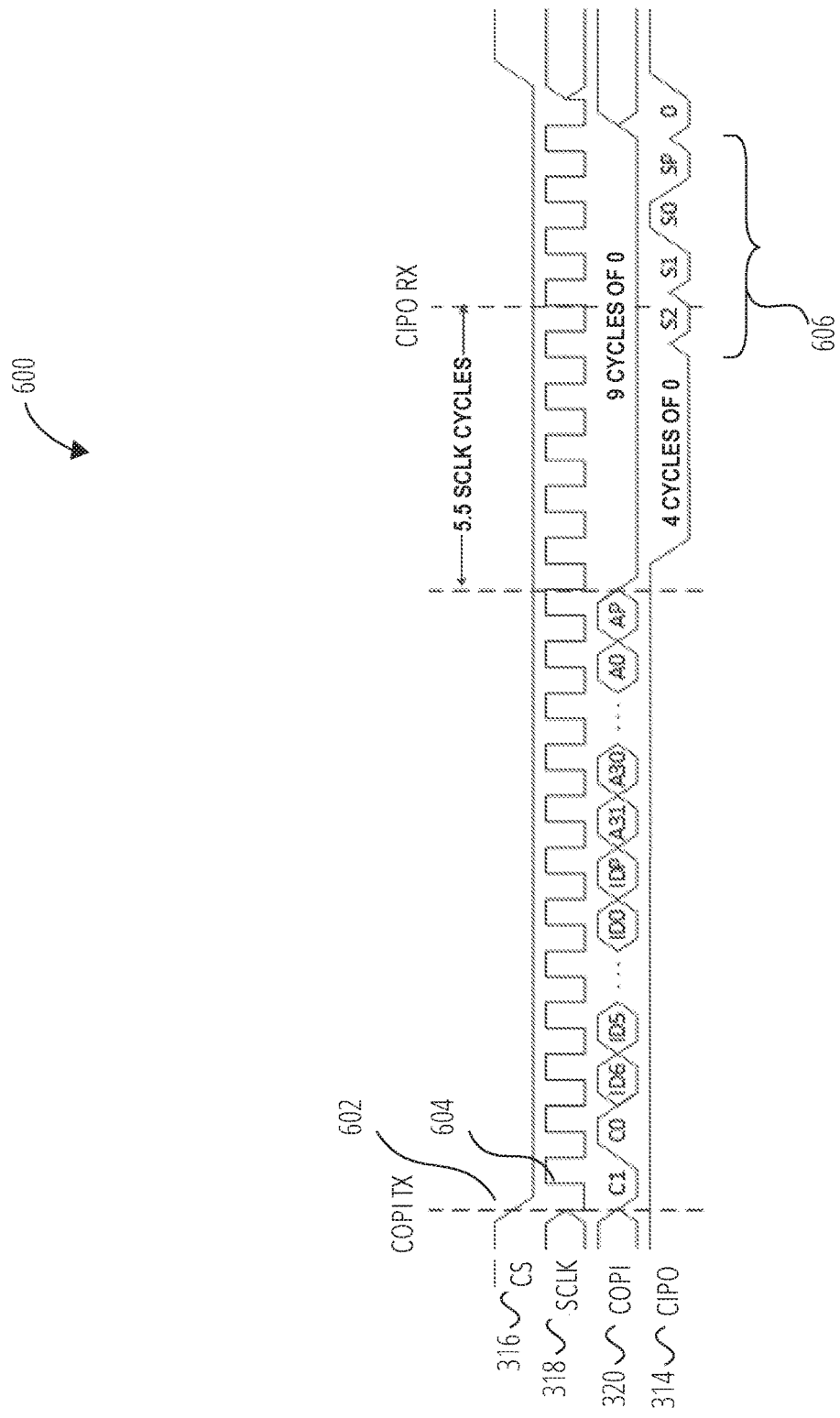
FIG. 6 illustrates a third timing diagram in accordance with one embodiment.

FIG. 6 illustrates generally a third timing diagram 600 with a deferred return secondary device status. FIG. 6 includes examples of the select signal 316, the clock signal 318, the secondary device input signal 320, and the secondary device output signal 314. In an example, the primary device 310 can initiate communication according to the third timing diagram 600 by setting the select signal 316 low, as generally indicated by reference numeral 602.

On a first rising edge 604 of the clock signal 318 following the transition at 602, the primary device 310 can provide a Command message. In the example of FIG. 6, the Command message is 0-1 and indicates to the secondary device that the message includes a read request or instruction. Following the Command message, the primary device 310 can send the Chiplet Identification message, such as followed by the Address message, such as to indicate a register location.

In response to the Command, Chiplet Identification, and Address messages, the secondary device can prepare and communicate a response to the primary device 310, such as using the secondary device output signal 314. In the example of FIG. 6, the secondary device output signal 314 comprises a signal that leads with a deferred secondary device status message 606 (e.g., Secondary device status message 0-0-1). From the information in Table 2, the Secondary device status message can be understood to be a request for a Deferred Read Response.

In an example, the deferred secondary device status message 606, or Deferred Read Response status, can be provided by the secondary device when the secondary device is unable to reply or is otherwise not ready to send a proper response to the primary device 310. In other words, the secondary device can issue the deferred secondary device status message 606 to request more time to complete the instruction as-received from the primary device 310 following the onset of the communication. Following the deferred secondary device status message 606 in the third timing diagram 600, the communication can terminate. In an example, upon receiving the deferred secondary device status message 606, the primary device 310 can queue a deferred read request for later communication to the secondary device.

Figure 7:
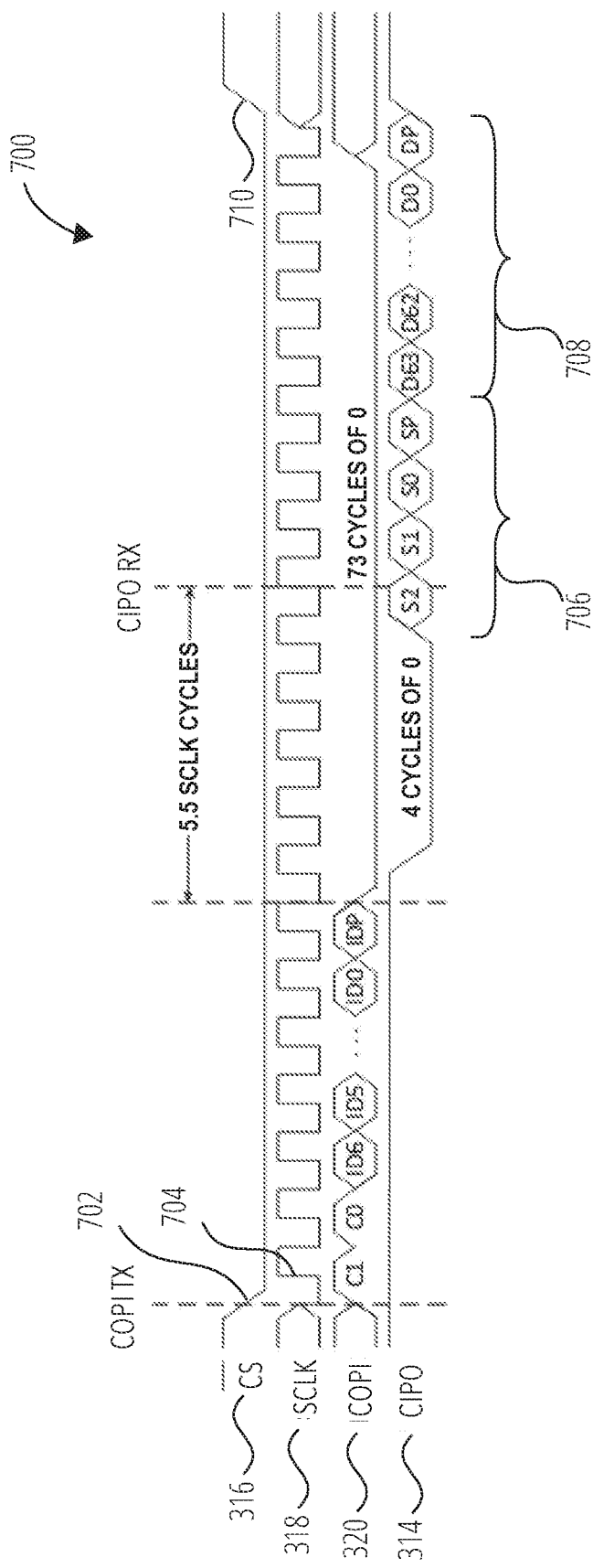
FIG. 7 illustrates a fourth timing diagram in accordance with one embodiment.

FIG. 7 illustrates generally a fourth timing diagram 700 with a deferred read response from a secondary device. FIG. 7 includes examples of the select signal 316, the clock signal 318, the secondary device input signal 320, and the secondary device output signal 314. In an example, the primary device 310 can initiate communication according to the fourth timing diagram 700 by setting the select signal 316 low, as generally indicated by reference numeral 702.

On a first rising edge 704 of the clock signal 318 following the CS transition at 702, the primary device 310 can provide a Command message. In the example of FIG. 7, the Command message is 1-1 and indicates to the secondary device that the message includes a deferred read request or instruction. In other words, the deferred read request or instruction can indicate to the secondary device that the present instruction follows a previous instruction, received from the same secondary device, to defer its response. Following the Command message, the primary device 310 can send the Chiplet Identification message.

In the example of FIG. 7, the deferred read request omits an Address message. Since the secondary device previously issued a deferral, the secondary device can be configured to expect to receive the deferred read request. Accordingly, the secondary device can queue its response in a cache register, for example, to help expedite its reply and thereby obviate any need for the primary device 310 to repeat the Address message with each deferred read request.

In response to the Command and Chiplet Identification messages, the secondary device can prepare and communicate a response to the primary device 310, such as using the secondary device output signal 314. In the example of FIG.

7, the secondary device output signal 314 includes a signal that leads with a secondary device status message 706 that is followed by a payload data message 708. The communication can terminate following transmission of the data message 708, when the primary device 310 sets the select signal 316 high, such as indicated in FIG. 7 by reference numeral 710.

Figure 8:
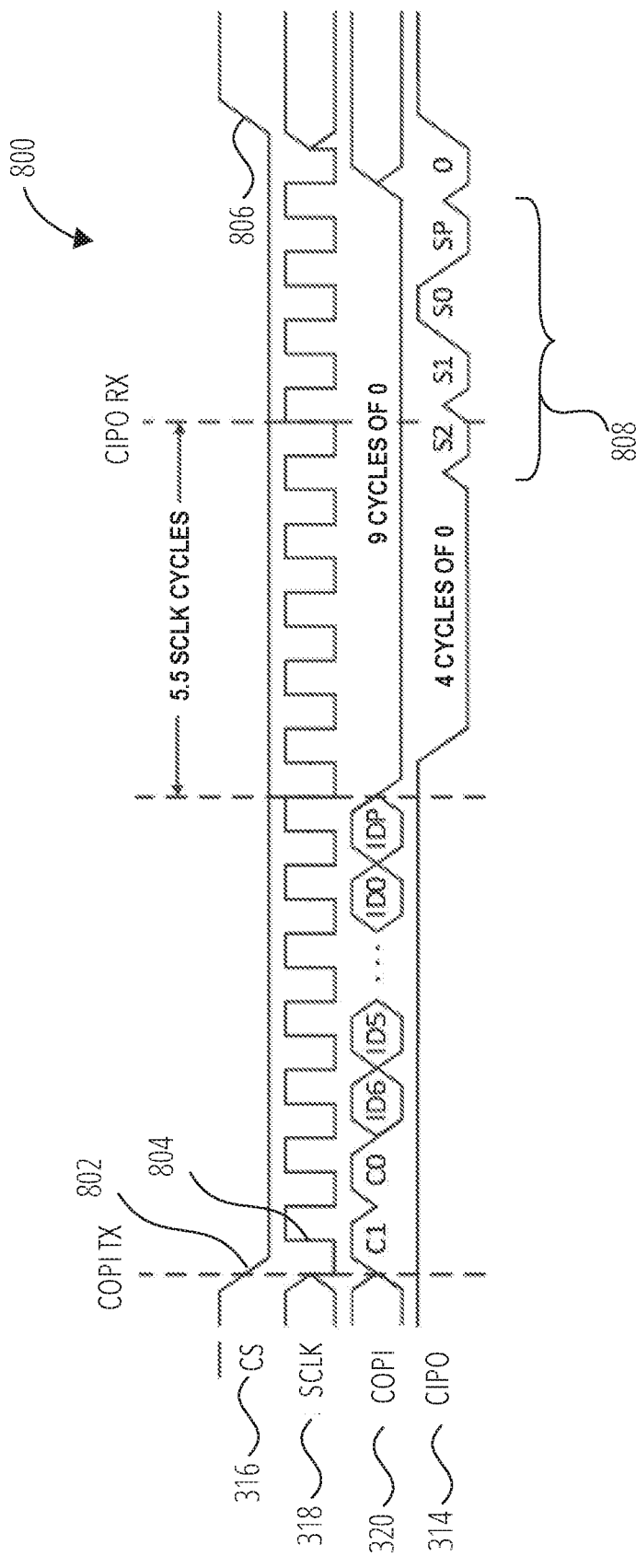
FIG. 8 illustrates a fifth timing diagram in accordance with one embodiment.

FIG. 8 illustrates generally a fifth timing diagram 800 with a further deferred read response from a secondary device. FIG. 8 includes examples of the select signal 316, the clock signal 318, the secondary device input signal 320, and the secondary device output signal 314. In an example, the primary device 310 can initiate communication according to the fifth timing diagram 800 by setting the select signal 316 low, as generally indicated by reference numeral 802.

On a first rising edge 804 of the clock signal 318 following the CS transition at 802, the primary device 310 can provide a Command message. In the example of FIG. 8, the Command message is 1-1 and indicates to the secondary device that the message includes a deferred read request or instruction. In other words, the deferred read request or instruction can indicate to the secondary device that the present instruction follows a previous instruction, received from the same secondary device, to defer its response. Following the Command message, the primary device 310 can send the Chiplet Identification message.

In the example of FIG. 8, the deferred read request omits an Address message. Since the secondary device previously issued a deferral, the secondary device can be configured to expect to receive the deferred read request. Accordingly, the secondary device can queue its response in a cache register, for example, to help expedite its reply and thereby obviate any need for the primary device 310 to repeat the Address message with each deferred read request.

In response to the Command and Chiplet Identification messages, the secondary device can prepare and communicate a response to the primary device 310, such as using the secondary device output signal 314. In the example of FIG. 8, the secondary device output signal 314 includes a signal that leads with a secondary device status message 808 that indicates a deferral. That is, the secondary device output signal 314 can include a signal that leads with a deferred secondary device status message (e.g., Secondary device status message 0-0-1), such as can indicate a request for a Deferred Read Response. In an example, the Deferred Read Response status can be provided by the secondary device when the secondary device is initially, or remains, unable to reply properly to the primary device 310. In other words, the secondary device can issue the secondary device status message 808 with a further deferral to request additional time to complete the instruction as previously received from the primary device 310.

In an example, following the secondary device status message 808 in the fifth timing diagram 800, the communication can terminate. In an example, upon receiving the secondary device status message 808 indicating a further deferral, the primary device 310 can queue a deferred read request for later communication to the secondary device, or, in some examples, can give up after a specified duration or specified number of read attempts.

Figure 9:
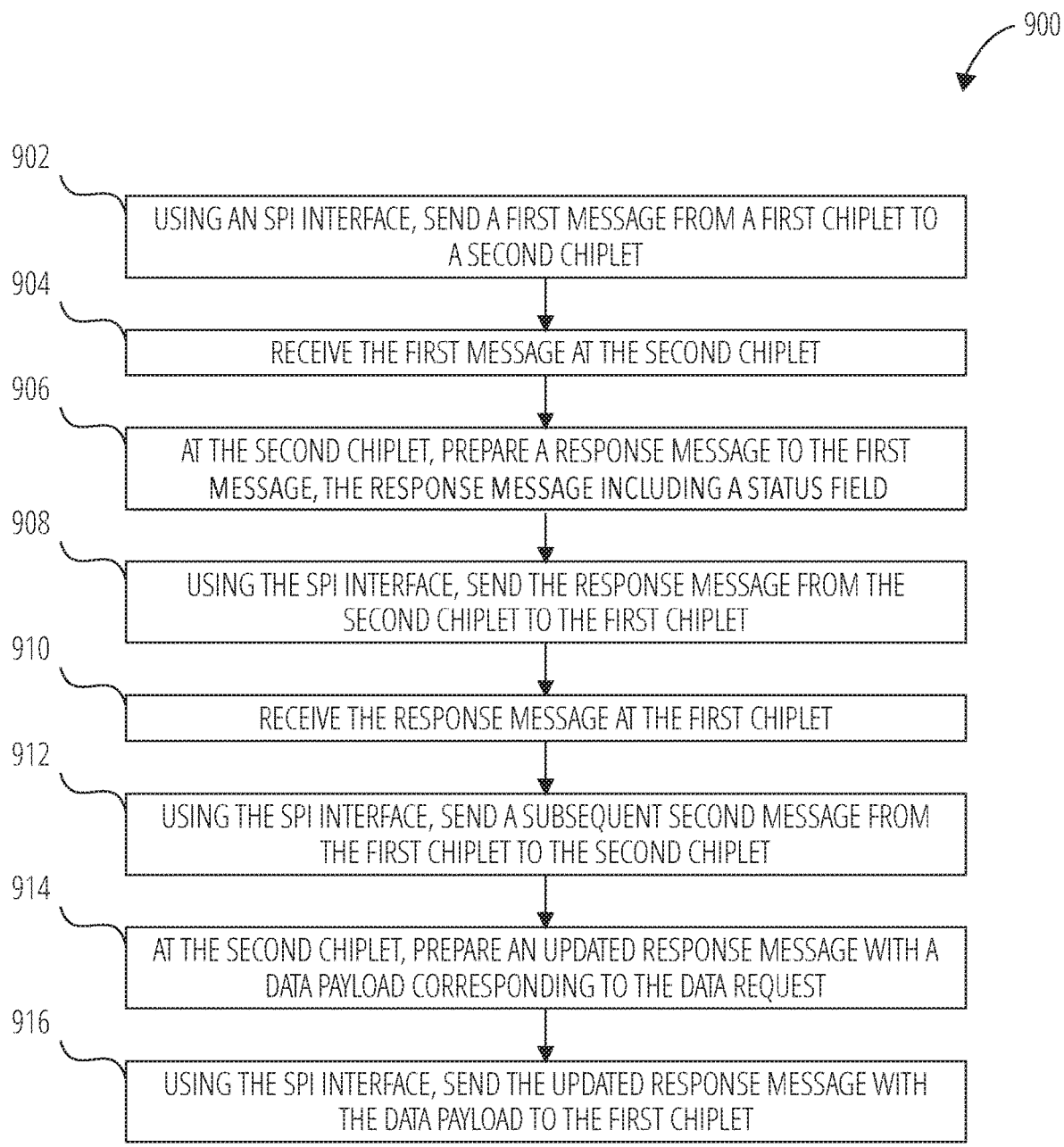
FIG. 9 illustrates a flow diagram of an example of a method for communicating using a serial peripheral interface with deferred response messaging, in accordance with one embodiment.

FIG. 9 illustrates a flow diagram of an example of a first method 900 for communication using an SPI interface with deferred response messaging, in accordance with one embodiment. In the example of FIG. 9, the first method 900 begins at block 902 with using an SPI interface to communicate messages between a first chiplet, or primary device, and a second chiplet, or secondary device. Block 902 can include using the SPI interface to send a first message from the first chiplet to the second chiplet, such as in a system with two or more chiplets.

The first message can include various fields, such as a command field with one or more bits configured to enable access to the second chiplet, and a chiplet identification field with one or more bits configured to indicate or specify the second chiplet from among one or more other chiplets in the system. In an example, the first message comprises a request for a particular data payload from the second chiplet. In an example, the first message comprises an initialization instruction for the second chiplet.

At block 904, the first method 900 can include receiving the first message at the second chiplet. At block 906, the first method 900 can include using the second chiplet to prepare a response message to the first message. In an example, the response message can include one or more fields or bits, such as a secondary device status field. The status field can include one or more bits that indicate a status of the second chiplet, including a readiness of the second chiplet to provide a particular data payload to the first chiplet. At block 908, the second chiplet can use the SPI interface to send the response message to the first chiplet. In an example, the response message can include information about an initialization status of the second chiplet.

At block 910, the first method 900 can include receiving the response message at the first chiplet, such as via the SPI interface. At block 912, the first method 900 can include using the same SPI interface to send a subsequent second message from the first chiplet to the second chiplet. The subsequent second message can include, for example, a particular data request. In an example, the first message and the second message comprise requests for the same data payload from the same second chiplet. For example, the first and second messages can comprise requests for verification or timing information about initialization of the second chiplet.

At block 914, the second chiplet can prepare an updated response message. In an example, the updated response message can include a data payload corresponding to the data request in the second message. For example, the payload can include information indicating that the second chiplet is initialized and ready to begin using another protocol or bus to carry out other operations. At block 916, the first method 900 can include using the SPI interface to send the updated response message with the data payload from the second chiplet to the first chiplet.

Figure 10:
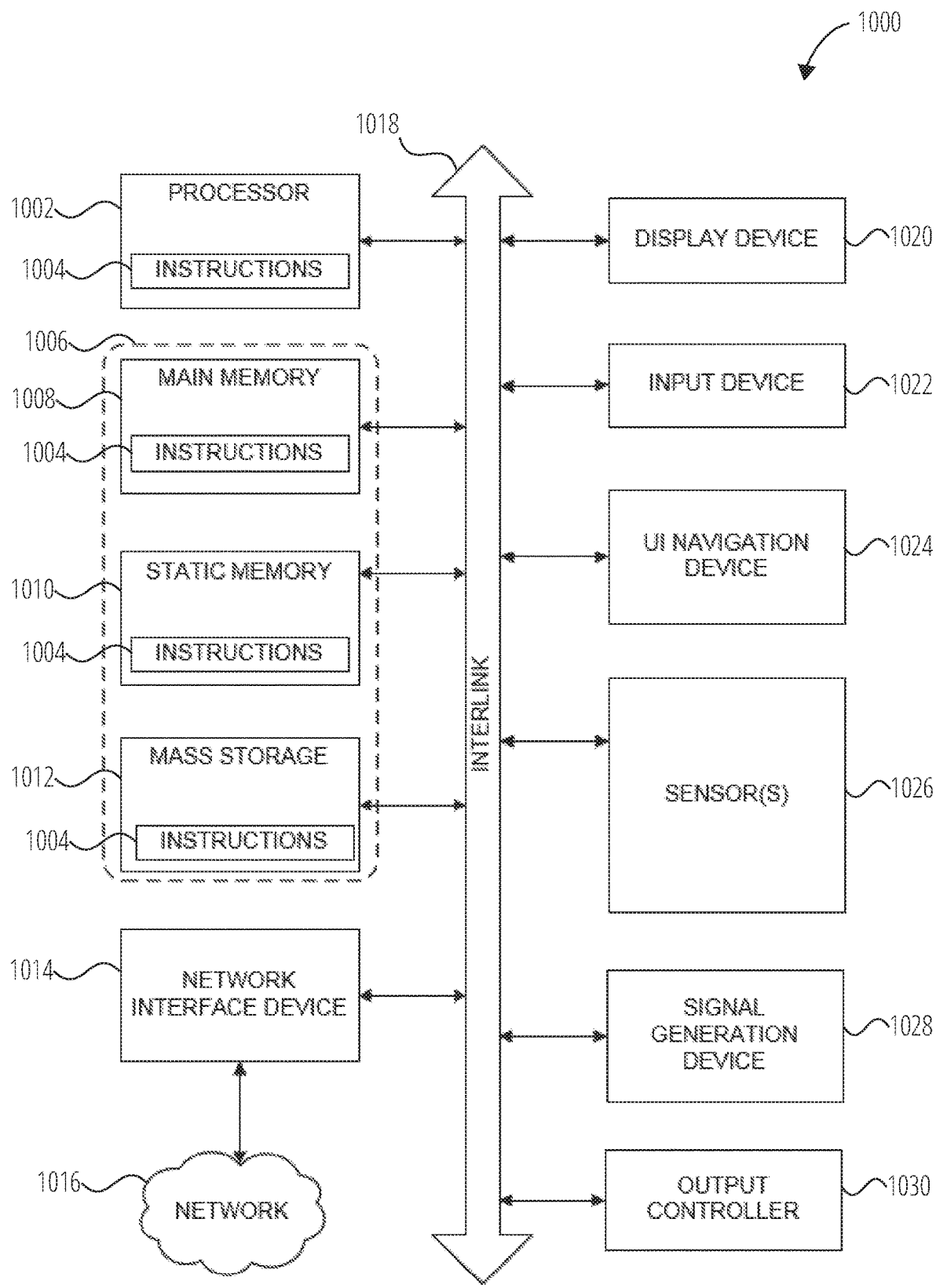
FIG. 10 illustrates an example of a machine with which, in which, or by which embodiments of the present disclosure can operate.

FIG. 10 illustrates a block diagram of an example machine 1000 with which, in which, or by which any one or more of the techniques (e.g., methodologies) discussed herein can be implemented. Examples, as described herein, can include, or can operate by, logic or a number of components, or mechanisms in the machine 1000. Circuitry (e.g., processing circuitry) is a collection of circuits implemented in tangible entities of the machine 1000 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1000 follow.

In alternative embodiments, the machine 1000 can operate as a standalone device or can be connected (e.g., networked) to other machines. In a networked deployment, the machine 1000 can operate in the capacity of a server machine, a client machine, or both in server-client network environments. In an example, the machine 1000 can act as a peer machine in peer-to-peer (P2P) (or other distributed) network environment. The machine 1000 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 1000 (e.g., computer system) can include a hardware processor 1002 (e.g., a central processing unit (CPU), a graphics processing unit (GPU), a hardware processor core, or any combination thereof), a main memory 1008, a static memory 1010 (e.g., memory or storage for firmware, microcode, a basic-input-output (BIOS), unified extensible firmware interface (UEFI), etc.), and mass storage 1012 (e.g., hard drives, tape drives, flash storage, or other block devices) some or all of which can communicate with each other via an interlink 1018 (e.g., a bus, such as an SPI bus). The machine 1000 can further include a display device 1020, an alphanumeric input device 1022 (e.g., a keyboard), and a user interface (UI) navigation device 1024 (e.g., a mouse). In an example, the display device 1020, input device 1022, and navigation device 1024 can be a touch screen display. The machine 1000 can additionally include a mass storage 1012 (e.g., drive unit), a signal generation device 1028 (e.g., a speaker), a network interface device 1014, and one or more sensor(s) 1026, such as a global positioning system (GPS) sensor, compass, accelerometer, or other sensor. The machine 1000 can include an output controller 1030, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1002, the main memory 1008, the static memory 1010, or the mass storage 1012 can be, or include, a machine-readable medium 1006 on which is stored one or more sets of data structures or instructions 1004 (e.g., software) embodying or utilized by any one or more of the techniques or functions described herein. The instructions 1004 can also reside, completely or at least partially, within any of registers of the processor 1002, the main memory 1008, the static memory 1010, or the mass storage 1012 during execution thereof by the machine 1000. In an example, one or any combination of the hardware processor 1002, the main memory 1008, the static memory 1010, or the mass storage 1012 can constitute the machine-readable medium 1006 or media. While the machine-readable medium 1006 is illustrated as a single medium, the term "machine readable medium" can include a single medium or multiple media (e.g., a centralized or distributed database, or associated caches and servers) configured to store the one or more instructions 1004. In an example, the various memory units or processor 1002 can be communicatively coupled using a bus such as an SPI bus.

The term "machine readable medium" can include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable medium 1006 can be representative of the instructions 1004, such as instructions 1004 themselves or a format from which the instructions 1004 can be derived. This format from which the instructions 1004 can be derived can include source code, encoded instructions (e.g., in compressed or encrypted form), packaged instructions (e.g., split into multiple packages), or the like. The information representative of the instructions 1004 in the machine-readable medium 1006 can be processed by processing circuitry into the instructions to implement any of the operations discussed herein. For example, deriving the instructions 1004 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1004.

In an example, the derivation of the instructions 1004 can include assembly, compilation, or interpretation of the information (e.g., by the processing circuitry) to create the instructions 1004 from some intermediate or preprocessed format provided by the machine-readable medium 1006.

The information, when provided in multiple parts, can be combined, unpacked, and modified to create the instructions 1004. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1004 can be further transmitted or received over a communication network 1016 using a transmission medium via the network interface device 1014 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1014 can include one or more physical jacks (e.g., Ethernet, coaxial, or phone jacks) or one or more antennas to connect to the communication network 1016. In an example, the network interface device 1014 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium.

The following are examples or devices and methods in accordance with the teachings herein.

Example 1 can include a chiplet system comprising a first chiplet coupled to multiple other chiplets using a serial peripheral interface (SPI) interface using an SPI protocol, the first chiplet configured as an SPI primary device. In Example 1, the first chiplet can be configured to send a first message across the SPI interface, the first message comprising a command field configured to access a first selected chiplet of the multiple other chiplets. In Example 1, the first selected chiplet can be configured as an SPI secondary device or peripheral device. Example 1 can further include the first chiplet configured to receive a response message from the first selected chiplet in response to the first message, and the response message can include a secondary device status field of the response message. The secondary device status field can indicate a readiness of the first selected chiplet to provide a data payload to the first chiplet.

Example 2 can include or use features of Example 1, and can further include the secondary device status field having one or more bits set to indicate a deferred return status, and the first chiplet can be further configured to, in response to receiving a response message with one or more bits set to indicate a deferred return status, send a deferred read request to the first selected chiplet.

Example 3 can include or use features of Example 2, and can further include the first selected chiplet. In response to the deferred read request, the first selected chiplet can be configured to send an updated response message to the primary device, and the updated response message can comprise the secondary device status field having one or more bits to indicate a subsequent readiness of the secondary device to provide the data payload to the primary device.

Example 4 can include or use features of any of the preceding examples, and can further include, in the command field of the first message, one or more bits set to indicate whether the primary device previously received a deferral from the secondary device.

Example 5 can include or use features of any of the preceding examples, and can further include, in the first message, a register address field of the first message, the register address field including one or more bits set to indicate an address of a memory register on the first selected chiplet.

Example 6 can include or use the features of Example 5, wherein the first message comprises a data field, and data in the data field is configured to be stored in a location corresponding to the register address field of the first message.

Example 7 can include or use the features of Example 6, wherein the first message comprises a chiplet identification field of the first message indicating the first selected chiplet of the multiple other chiplets, and wherein in the first message, the data field immediately follows the chiplet identification field, and the chiplet identification field immediately follows the command field.

Example 8 can include or use features of any of the preceding examples, wherein the response message comprises the payload, and the payload comprises data from a memory register on the first selected chiplet.

Example 9 can include or use features of any of the preceding examples, wherein the command field of the first message includes one or more bits set to enable the first selected chiplet to access specified memory registers on the first selected chiplet.

Example 10 can include a system comprising a first chiplet coupled to multiple to multiple other chiplets, wherein the first chiplet is configured to generate a clock signal, and Example 10 can further include a first selected chiplet of the multiple other chiplets, wherein the first selected chiplet is configured to interface with the first chiplet using a serial peripheral interface (SPI) interface protocol. In Example 10, the first chiplet can be configured to perform operations comprising: enable a controller on the first selected chiplet, send the clock signal to the first selected chiplet, send a first message to the first selected chiplet using the SPI interface, wherein the first message comprises a command field of the first message, the command field including one or more bits to enable the controller to access memory registers of the first selected chiplet, and a register address field of the first message, the register address field including one or more bits to address a particular memory register on the first selected chiplet chiplet. In Example 10, in response to receiving the first message, the first selected chiplet can be configured to send a response message to the first chiplet using the SPI interface, wherein the response message comprises a secondary device status field including one or more bits to indicate a readiness of the first selected chiplet to provide a payload to the first chiplet.

Example 11 can include or use the features of Example 10, wherein the first message further comprises a data field of the first message.

Example 12 can include or use the features of Example 10 or Example 11, wherein the response message comprises the payload when the secondary device status field indicates the first selected chiplet is ready to provide the payload.

Example 13 can include or use the features of any of Examples 10-12, wherein the response message comprises one or more bits set to instruct the first chiplet to queue a later read request for the first selected chiplet.

Example 14 can include or use the features of any of Examples 10-13, wherein the first message comprises a chiplet identification field of the first message, the chiplet identification field including one or more bits to address the first selected chiplet, and wherein in the first message, the chiplet identification field immediately follows the command field, and the register address field immediately follows the chiplet identification field.

Example 15 can include or use the features of any of Examples 10-14, wherein the response message leads with the secondary device status field before one or more other data bits.

Example 16 can include a method comprising, at a first chiplet that is configured to be communicatively coupled to a second chiplet using a serial peripheral interface (SPI) interface bus, sending a first message to the second chiplet, wherein the first message comprises a command field of the first message including one or more bits configured to enable access to the second chiplet. In Example 16, the method can comprise, receiving a response message from the second chiplet in response to the first message from the first chiplet, the response message comprising a secondary device status field, wherein the secondary device status field includes one or more bits selected to indicate a readiness of the second chiplet to provide a data payload to the first chiplet.

Example 17 can include or use the features of Example 16, and can further include preparing the response message at the second chiplet. Preparing the response message at the second chiplet can include preparing a response message that indicates a deferral in the secondary device status field, and the method can further include receiving the response message at the first chiplet, and sending a subsequent second message to the second chiplet to determine whether the data payload is available.

Example 18 can include or use the features of Example 17, and can further include, in response to the subsequent second message, sending an updated response message from the second chiplet to the first chiplet, the updated response message comprising one or more bits in the secondary device status field to indicate a subsequent readiness of the second chiplet to provide the data payload to the first chiplet.

Example 19 can include or use the features of any of Examples 16-18, wherein the command field of the first message indicates whether the first message is an original read request or a deferred read request for information in a specified register of the second chiplet.

Example 20 can include or use the features of any of Examples 16-19, wherein the first chiplet is communicatively coupled to a third chiplet using the SPI interface bus, and the method further comprises, at the first chiplet, sending a second message to the third chiplet, wherein the second message comprises a command field of the second message including one or more bits configured to enable access to the third chiplet, and at the third chiplet, receiving the second message from the first chiplet and, in response, preparing a second response message that comprises a secondary device status field, wherein the secondary device status field includes one or more bits selected to indicate a readiness of the third chiplet to provide a data payload to the first chiplet.

Each of the above Examples can be combined or used together in various ways to carry out deferred communications over a synchronous interface, such as over an SPI interface.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus comprising:
a first chiplet couplable to multiple other chiplets using a serial peripheral interface (SPI) configured for an SPI protocol, the first chiplet configured as an SPI primary device, wherein the first chiplet is configured to:
send a first message across the SPI interface, the first message comprising a first command field and a register address field, wherein the first message is configured to access a first register corresponding to the register address field at a first selected chiplet of the multiple other chiplets, the first selected chiplet configured as an SPI secondary device, and wherein the first command field indicates an initial request for the first selected chiplet;

receive a response message from the first selected chiplet in response to the first message, wherein the response message comprises a secondary device status field indicating a response deferral; and in response to receiving the response message, send a second message across the SPI interface, the second message comprising a second command field that is different from the first command field and indicates a subsequent request for the first selected chiplet, wherein the second message is configured to access the first register at the first selected chiplet.

2. The apparatus of claim 1, further comprising the first selected chiplet wherein in response to the second message, the first selected chiplet is configured to send an updated response message to the first chiplet, and the updated response message comprises the secondary device status field including one or more bits to indicate a subsequent readiness of the first selected chiplet to provide a data payload to the first chiplet.

3. The apparatus of claim 1, wherein the first message comprises a data field, and data in the data field is configured to be stored in a location corresponding to the register address field of the first message.

4. The apparatus of claim 3, wherein the first message comprises a chiplet identification field indicating the first selected chiplet of the multiple other chiplets;

wherein in the first message, the data field immediately follows the chiplet identification field, and the chiplet identification field immediately follows the command field.

5. The apparatus of claim 2, wherein the updated response message comprises the data payload, and the data payload comprises data from the first register on the first selected chiplet.

6. The apparatus of claim 1, wherein the command field includes one or more bits set to enable the first selected chiplet to access specified memory registers on the first selected chiplet.

7. A system comprising:

a first chiplet coupled to multiple other chiplets, the first chiplet configured to generate a clock signal; and a first selected chiplet of the multiple other chiplets, the first selected chiplet configured to interface with the first chiplet using a serial peripheral interface (SPI) protocol;

wherein the first chiplet is configured to perform operations comprising:

enable a controller on the first selected chiplet;

send the clock signal to the first selected chiplet;

send a first message to the first selected chiplet using the SPI interface, wherein the first message comprises a command field and a register address field, the command field including one or more bits to enable the controller to access memory registers of the first selected chiplet, and the register address field including one or more bits to address a particular memory register on the first selected chiplet;

in response to receiving a deferral message from the first selected chiplet, send a second message to the first selected chiplet using the SPI interface, wherein the second message includes a different second command field and the second message excludes the register address field; and wherein, in response to receiving the second message, the first selected chiplet is configured to:

send a response message to the first chiplet using the SPI interface, wherein the response message comprises a payload corresponding to the register address field in the first message.

8. The system of claim 7, wherein the first message further comprises a data field.

9. The system of claim 7, wherein the response message comprises the payload and a secondary device status field that indicates the first selected chiplet is ready to provide the payload.

10. The system of claim 7, wherein the deferral message comprises one or more bits set to instruct the first chiplet to queue a later read request for the first selected chiplet.

11. The system of claim 7, wherein each of the first message and the second message comprises a chiplet identification field including one or more bits to address the first selected chiplet.

12. The system of claim 7, wherein the response message leads with a secondary device status field before one or more other data bits of the payload.

13. A method comprising:

at a first chiplet configured to be communicatively coupled to a second chiplet using a serial peripheral interface (SPI) interface bus, sending a first message to the second chiplet, wherein the first message comprises a first command field and a register address field, wherein the first message is configured to access a first register corresponding to the register address field at the second chiplet, and the first command field indicates an initial request;

receiving a response message from the second chiplet in response to the first message from the first chiplet, the response message comprising a secondary device status field, wherein the secondary device status field includes one or more bits indicating a deferral to provide a data payload to the first chiplet; and in response to receiving the response message, sending a second message to the second chiplet, wherein the second message excludes the register address field and the second message includes a second command field that is different from the first command field, and the second message indicates a subsequent request corresponding to the register address field from the first message.

14. The method of claim 13, wherein the second message comprises a query to determine whether the data payload is available from the second chiplet.

15. The method of claim 14, further including, in response to the second message, sending an updated response message from the second chiplet to the first chiplet, the updated response message comprising one or more bits in the secondary device status field to indicate a subsequent readiness of the second chiplet to provide the data payload to the first chiplet.

16. The method of claim 13, wherein the command field indicates whether the first message is an original read request or a deferred read request for information in a specified register of the second chiplet.

17. The method of claim 13, wherein the first chiplet is communicatively coupled to a third chiplet using the SPI interface bus, and the method further comprising:

at the first chiplet, sending a third message to the third chiplet, wherein the third message comprises a third command field including one or more bits configured to enable access to the third chiplet; and at the third chiplet,
receiving the third message from the first chiplet and, in response,
preparing a second response message that comprises a secondary device status field that includes one or more bits selected to indicate a readiness of the third chiplet to provide a data payload to the first chiplet.

18. The apparatus of claim 1, wherein the second message omits the register address field.

19. The apparatus of claim 1, wherein the first message and the second message each comprise a chiplet identification field indicating the first selected chiplet of the multiple other chiplets.

20. The apparatus of claim 1, wherein the first message comprises the first command field indicating the initial request, a chiplet identification field indicating the first selected chiplet, and the register address field indicating the first register; and wherein the second message comprises the second command field indicating the subsequent request, the chiplet identification field indicating the first selected chiplet, and the second message omits the register address field indicating the first register.

* * * * *